United States Patent
Sauvignet et al.

(10) Patent No.: US 7,981,297 B2
(45) Date of Patent: Jul. 19, 2011

(54) WASTEWATER TREATMENT METHOD COMPRISING DECANTATION AND FINE SCREENING STAGES

(75) Inventors: Philippe Sauvignet, Saint-Etienne-En-Cogles (FR); Claus Poulsen Dahl, Hedehusene (DK)

(73) Assignee: OTV SA, Saint Maurice Cedex (FR)

( * ) Notice: Subject to any disclaimer, the term of this patent is extended or adjusted under 35 U.S.C. 154(b) by 525 days.

(21) Appl. No.: 12/093,524

(22) PCT Filed: Nov. 2, 2006

(86) PCT No.: PCT/EP2006/068046
§ 371 (c)(1), (2), (4) Date: Jun. 16, 2008

(87) PCT Pub. No.: WO2007/054461
PCT Pub. Date: May 18, 2007

(65) Prior Publication Data
US 2008/0296228 A1 Dec. 4, 2008

(30) Foreign Application Priority Data
Nov. 14, 2005 (FR) ..................... 05 11525

(51) Int. Cl.
*C02F 1/32* (2006.01)
*C02F 1/42* (2006.01)
*C02F 1/54* (2006.01)

(52) U.S. Cl. ........ 210/666; 210/668; 210/694; 210/714; 210/721; 210/727; 210/748.11; 210/754; 210/756; 210/760; 210/764

(58) Field of Classification Search ................... 210/665
See application file for complete search history.

(56) References Cited

U.S. PATENT DOCUMENTS

| | | | | |
|---|---|---|---|---|
| 4,280,913 A * | 7/1981 | Applegate et al. | ............ | 210/669 |
| 6,379,549 B1 * | 4/2002 | LePoder et al. | ............... | 210/631 |
| 6,416,668 B1 * | 7/2002 | Al-Samadi | .................... | 210/636 |
| 6,582,605 B2 * | 6/2003 | Krulik et al. | .................. | 210/638 |
| 6,602,410 B1 | 8/2003 | Tanner et al. | | |
| 6,709,585 B1 | 3/2004 | Portillo et al. | | |
| 6,755,973 B2 * | 6/2004 | Allen | ............................. | 210/636 |
| 7,008,543 B2 * | 3/2006 | Newkirk et al. | ............... | 210/667 |
| 7,279,099 B2 * | 10/2007 | Reimers et al. | ............... | 210/601 |
| 7,678,278 B2 * | 3/2010 | Binot et al. | .................... | 210/661 |

FOREIGN PATENT DOCUMENTS

| | | |
|---|---|---|
| FR | 2767521 | 8/1997 |
| WO | 02/42223 | 5/2002 |

* cited by examiner

*Primary Examiner* — Peter A Hruskoci
(74) *Attorney, Agent, or Firm* — Coats & Bennett, P.L.L.C.

(57) ABSTRACT

A method for removing helminth egg and other suspended solids from a wastewater stream includes directing the wastewater to a ballasted flocculation system and adding a coagulation agent, flocculation agent and a ballast into the wastewater. Sludge is settled from the wastewater in a settling tank at a rate of at least 10 meters per hour. The method further includes removing helminth egg by filtering the effluent through a fine screen having a mesh diameter of approximately 5 micrometers to approximately 25 micrometers. After passing through the fine screen, the filtered effluent has less than one helminth egg per liter.

8 Claims, 1 Drawing Sheet

WASTEWATER TREATMENT METHOD COMPRISING DECANTATION AND FINE SCREENING STAGES

This application is a U.S. National Stage application of PCT Application No. PCT/EP2006/068046, with an international filing date of Nov. 2, 2006. Applicant claims priority based on French application serial no. 05 11525 filed Nov. 14, 2005.

The field of the invention is that of water treatment. More precisely, the invention relates to a physical or physical and chemical method for the reduction of the content of matters in suspension or parasites in such water, as well as the device corresponding to this method.

The invention can be used for treating any water containing matter in suspension when reduction of this matter content is such as in particular:
- wastewater already treated biologically, in order to refine the purification thereof;
- wastewater intended to be reused after treatment, for example in industry or agriculture, in particular for irrigation;
- water intended to be discharged into the sea;
- wastewater already treated, biologically or otherwise, in order to control the residual phosphorus content of the discharge.

As indicated below, the method and device according to the invention are particularly advantageous for treating matters in suspension contained in waters intended to be reused for irrigation.

This is because wastewater is being re-used more and more frequently in irrigation, both for the irrigation of cultivation and for that of municipal parks or golf courses for example.

Usually wastewater is treated in order to remove therefrom the pollution that may represent a danger for the quality of the environment receiving the treated wastewater. Thus, apart from the parameters representing carbonaceous, nitrogenous and phosphorous pollutions, microbiology is more and more often taken into account in the treatment requirements, with the frequent use of finishing treatments, such as exposure of treated water to ultraviolet or final filtration on membranes for example.

There exist in the prior art several techniques for treating matters in suspension. Among these techniques the following can be cited:
- physical or preferably physical and chemical settling consisting in subjecting the water to clarification possibly coupled with an addition of coagulating reagent in order to the ability of the matters in suspension to settle;
- filtration on a sand bed which thickness generally ranges between 1.5 and 2 m.

With regard to the treatment speeds applied to settling tanks of a conventional type, these rarely exceed 2 to 2.5 m/hour. These treatment speeds can be increased up to 10 to 15 m/hour when the settling tank used is of the lamellar type and up to 20 m/hour when the lamellar settling is coupled with a coagulation/flocculation step.

To obtain a good water quality, the prior art recommends the use of sand beds with a maximum filtration speed of 10 m/hour.

Both types of treatment therefore present the drawback of not being able to be implemented at high speed, which makes it necessary to use large installations involving high civil engineering costs.

Moreover, in the case of the reuse of wastewater for irrigation, it is generally required to provide treatment to limit the concentration of helminth eggs in irrigation water at a low level, usually 1 egg per liter of water.

These eggs are resistant to treatments of the UV or chlorine type and are for now removed either by final filtration on sand or by membrane micro- or ultrafiltration.

Thus it has been proposed, according to the French patent document having the publication number FR-2 767 521, to complete the removal of helminth eggs by successive passage of the biologically treated wastewater through a rapid settling step (>20 m/hour) and then in a multilayer ascending filtration step at high speed (>10 m/hour).

In a more elaborate combination, it is proposed to interpose a screening step, with a mesh ranging between 0.5 and 5 mm, between the settling tank and the filter, in order to minimise the arrival on the filtering material of sludge, fibres and other clogging elements possibly contained in the settled water.

This technique has shown to be efficient in reducing helminth eggs to levels always below the maximum limit usually sought of 1 egg per liter of water.

Although more compact than the slower finishing techniques by mono-layer and/or descending sand filtration, this rapid filtration technique however still remain relatively costly because of the size of the filtration equipment necessary.

The objective of the invention is in particular to propose a water treatment method that is less expensive than the methods of the prior art.

Another object of the invention is to propose a water treatment device that involves equipment of reduced size compared to those of the prior art.

Another objective of the invention is to provide such a method and/or such a device which is adapted to the treatment of water intended both for irrigation and for industry, or for use as drinking water.

These objectives, as well as others that will emerge subsequently, are achieved by virtue of the invention, the object of which is a water treatment method which aims to reduce the water content of matters in suspension, and in particular the content of parasites, comprising a settling step consisting in circulating said water through a settling tank at a treatment speed greater than 10 m/hour, characterised in that said settling step is followed by a fine screening step using a screen with mesh dimensions ranging between approximately 5 micrometers and approximately 25 micrometers.

It should be noted that the results obtained with the method according to the invention are as good as those obtained with the methods of the prior art which recommend a three steps treatment (settling, coarse screening and multi-layer filter filtration) and which in no way suggest that a method combining only two steps, including a fast settling and a fine screening, can lead to the required reduction in parasites.

According to a preferred embodiment, said fine screening step is carried out using a screen with mesh dimensions ranging between approximately 8 micrometers and approximately 12 micrometers.

It appears indeed that the wastewater leaves the settling tank with a statistically low helminth egg content (around less than one to a few helminth eggs per liter, depending on whether the wastewater is untreated or biologically treated) with such fine screening.

Thus, although helminth eggs are capable of ovalising in order to pass through the screen meshes, it became clear, unexpectedly, during the tests carried out by the Applicant, that the eggs remaining after the settling steps are reduced to a sufficient extent by a screening between 8 and 12 micrometers so that all the waters tested have a helminth egg concentration under the limit of 1 egg per liter after screening.

According to an advantageous solution, said settling step is preceded by a coagulation/flocculation step.

It appears indeed that the eggs tend to integrate the floc and are better stopped both at the settling and at the screening of the remaining flocs.

According to a first advantageous variant, said coagulation/flocculation step is obtained by recirculating the sludge coming from said settling step, with addition in said water of at least one coagulation agent and at least one flocculation agent.

In this case, the said flocculation step is preferentially carried out at a speed of at least 20 m/hour.

According to a second advantageous variant, said coagulation/flocculation step is obtained by adding to said water at least one coagulation agent, at least one flocculation agent and at least one water insoluble granular ballasting material.

In this case, said flocculation/coagulation step is preferentially carried out at a speed of at least 30 m/hour.

Advantageously, it comprises a step, downstream of said settling step, for injecting an oxidising agent.

In this case, said oxidising agent injection step is preferentially carried out upstream of said screening step.

Preferentially, said oxidising agent comprises at least one of the agents belonging to the following group:
chlorine;
sodium hypochlorite;
chlorine dioxide;
ozone.

In this way a disinfection of the water is carried out, in order to improve further the quality of the treated water.

Advantageously, the method comprises a step, upstream of said screening step, for injecting a powdery agent comprising at least one of the agents belonging to the following group:
activated carbon in granular form;
activated carbon in powder form;
ion exchange resin.

In this way the treatment of dissolved pollutants is carried out.

According to a first variant embodiment, it comprises, downstream of said screening step, a step for disinfecting said water by UV radiation.

According to a second variant embodiment, the method comprises, downstream of said settling step and upstream of said screening step, a step for disinfecting said water by UV radiation.

The invention also concerns a device for treating water in order to reduce the content of matters in suspension, and in particular the parasites content, comprising at least one settling tank, characterised in that it comprises, downstream of said settling tank, at least one screen, which screen mesh dimensions range between approximately 5 micrometers and approximately 25 micrometers, and preferentially between approximately 8 micrometers and approximately 12 micrometers.

According to a preferred solution, said settling tank is of the coagulation/flocculation/settling with ballasted floc type.

In this case, said settling tank is advantageously associated with a ballast comprising a granular material with a specific weight greater than that of water and with a mean diameter ranging between approximately 50 micrometers and approximately 250 micrometers.

According to a preferred embodiment, said screen or screens are of the disc or drum type.

Advantageously, it comprises means for unclogging said screen or screens.

In this case, the unclogging means preferentially comprise means for spraying washing water under pressure.

In this case, the device advantageously comprises means for disinfecting said washing water before its recirculation upstream of said settling tank.

Preferentially, said disinfecting means of said washing water are chosen from the following techniques:
chlorination;
ozonisation;
UV radiation.

Advantageously, said spraying means spray the washing water at counter-flow of said water to be treated.

According to an advantageous solution, the device comprises means for recirculating the washing water upstream of said settling tank.

Other characteristics and advantages of the invention will appear more clearly after reading the following description of a preferential embodiment of the invention, given as an illustrative and non-limitative example, and the accompanying drawings, amongst which:

Figure 1:
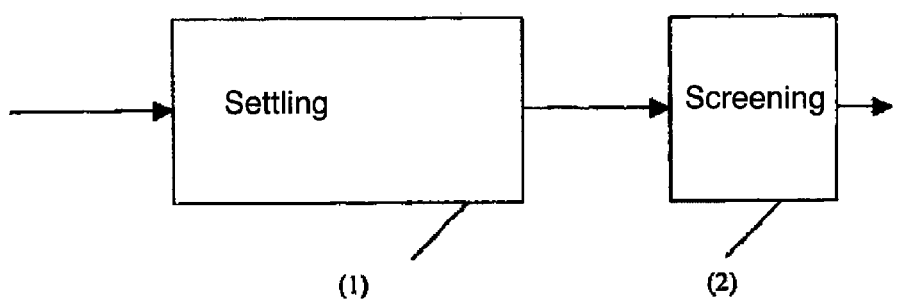
FIG. 1 is a schematic representation of the principle of the invention.

As illustrated by FIG. 1, the principle of the invention lies in successively causing the wastewater, untreated or biologically treated, to pass through a settling tank 1, then through a screening system 2, external to the settling tank and with a mesh ranging between 5 and 25 micrometers, preferentially between 8 and 12 micrometers.

Figure 2:
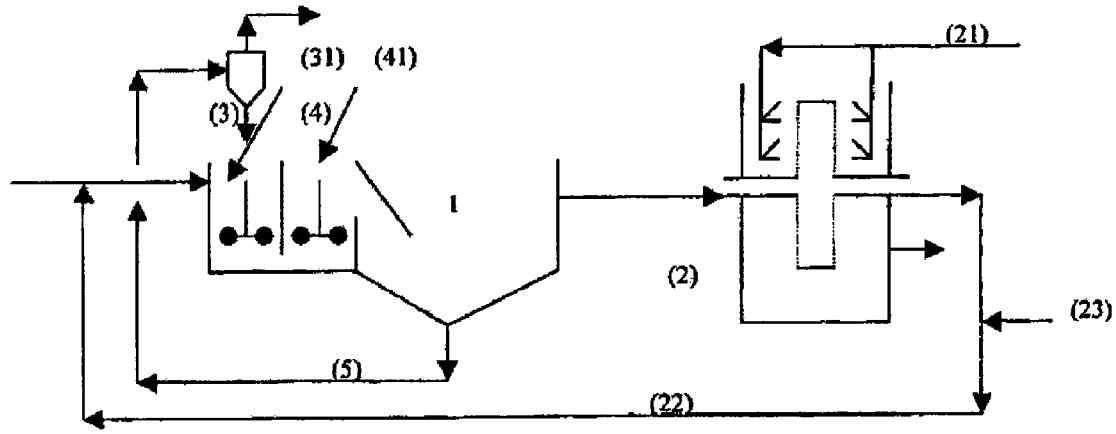
FIG. 2 is a schematic view of a water treatment device according to a preferential embodiment of the invention.

With reference to FIG. 2 the settling technique used will be preceded by a coagulation step 3, in line or in a coagulation basin, with injection 31 of a mineral salt or a cationic polyelectrolyte, and a flocculation phase 4 before injection 41 of an anionic or cationic polyelectrolyte (polymer).

According to another variant that can be envisaged, the settling tank 1 is a sludge recirculation settling tank, with the addition of at least one coagulating agent and one flocculating agent, functioning at a speed of at least 20 m/hour.

According to yet another variant that can be envisaged, the settling tank 1 is a ballasted floc settling tank, with addition of at least one coagulating agent, one flocculating agent and one water insoluble granular ballasting material, functioning at a speed of at least 30 m/hour, the ballast used in the settling tank 1 being a granular material with a specific gravity greater than that of water and with a mean diameter ranging between 50 and 250 micrometers.

A ballast of this type can for example consist of sand.

The screening step is carried out on screens external to the settling tank and downstream thereof, to allow the control of the screen clogging and the cleaning thereof.

The screen preferentially has a 10 micrometer mesh and is of the disc or drum type, the disc type being preferred.

The preferred screening direction is from the inside of the disc or drum towards the outside, while the screen will be preferentially equipped with water spray washing systems 21, with injection nozzles or manifolds preferentially disposed outside the screen, injecting the water in the opposite direction to the screening.

During tests, disc screens of the "Hydrotech" type (registered trademark) were used, these affording easy washing by means of nozzles disposed outside and easy of access, when the screen begins to clog.

With screens with a nominal mesh of 10 micrometers the Applicant found, on biologically treated wastewater intended for irrigation, helminth egg levels always below to one egg per liter after passing through coagulation/flocculation/ballasted settling and then screening, and this with settling speeds greater than 100 meters per hour, and approach speeds ranging between 10 and 30 m³ of settled water per hour and per square meter of developed screening surface, with coagulant doses (aluminium sulphate used in this case, iron salts also being an excellent coagulant) around 12 mg/l expressed as aluminium, and doses of polymer of 0.7 mg/l.

The concentrations of matter in suspension were divided by a factor of more than 20 in the same time, by passing through flocculation/ballasted settling/screening.

TABLE 1

| | |
|---|---|
| Throughput | 1,800-2,200 m³/h |
| Total retention time: | 15-20 minutes |
| Speed at settling tank mirror: | 50-58 m/hour |
| Dosing of coagulant: | 8 mg Al/l |
| Dosing of polymer: | 0.30 mg/l |
| pH: | 5.8-5.9 |
| Recirculation: | 4% of input rate |

TABLE 2

| Parameter | Input | Output | Objective | Efficiency |
|---|---|---|---|---|
| Colour | up to 109 mg Pt/l | 5 mg Pt/l | ≦15 mg/Pt/l | 95% |
| Matter in suspension | 3.3 mg/l | <2 mg/l | ≦5.0 mg/l | >38% |
| Turbidity | 4.5 NTU | 0.19 NTU | ≦1.00 NTU | — |
| KMnO$_4$ | 60.6 mg/l | 9.6 mg/l | — | 84% |
| COD$_{cr}$ | 34.8 mg/l | 9.3 mg/l | ≦20 mg/l | 74% |
| Total Aluminium | — | 0.12 mg Al/l | ≦0.50 mg Al/l | — |
| Dissolved Aluminium | — | <0.05 Al/l | ≦0.10 mg Al/l | — |

The settling/screening treatment therefore considerably reduces the level of matter in suspension in the treated water and promotes the polishing of this water by the use of supplementary treatments, such as:

the treatment of dissolved pollutants by the injection of powdery reagents, such as activated carbon in powder or granular form, or with ion exchange resins;

the disinfection of the water by oxidising reagent, such as ozone, hydrogen peroxide, chlorine, sodium hypochlorite, chlorine dioxide or chloramines, or by UV radiation.

It should be noted that UV may be applied after screening so as to benefit from the reduction in the content of matter in suspension (MS) due to the screening.

UV can also be applied upstream of the screening, regarding the good quality of the settled water.

In the latter case, application by UV emitters installed directly in the vicinity of the screening grille is preferred, illuminating the latter with a flow of UV, the germicidal action of which is reinforced by the fact that the microorganisms retained on the screen are subjected to high UV dosages by their periodic passage, at each turn through to the screen, in front of the UV emitters.

The screen washing water is preferentially recycled 22 upstream of the settling tank so as to be reflocculated and settled. In a manner that is preferred among all others, the washing water is disinfected by the action of an oxidant 23 before returning to the settling tank.

More generally, this washing water can be disinfected by chlorination, ionisation or UV radiation.

The same process chain can be applied with profit to the treatment of surface water of the river or lake water type, in particular in order to remove from it matter in suspension and microorganisms with a size greater than approximately 5 micrometers, but also dissolved heavy metals and colour. The treatment can also be supplemented by a disinfection treatment by oxidants or UV.

By way of indication tests carried out on lake water with an assembly comprising a floc settling tank ballasted with sand functioning at a settling speed of 58 m/hour followed by a screen with a 10 micrometers mesh gave, under the operating conditions indicated in table 1 below, the results of the following table 2:

The fine screen described above includes a mesh having an array of openings. These openings include a diameter. "Mesh diameter" refers to the shortest distance across the openings.

The invention claimed is:

1. A method for removing helminth egg and other suspended solids from a wastewater stream, the method comprising:
    directing the wastewater to a ballasted flocculation system and adding a ballast, a coagulation agent and a flocculation agent into the wastewater to form sludge in the wastewater;
    settling the sludge in the wastewater in a settling tank at a rate of at least 10 meters per hour and producing an effluent; and
    removing helminth egg from the effluent by filtering the effluent through a fine screen having a mesh diameter of approximately 8 micrometers to approximately 12 micrometers, such that the filtered effluent has less than 1 helminth egg per liter.

2. The method of claim 1 further comprising:
    settling the sludge in the wastewater in the settling tank at a rate of at least 20 meters per hour;
    the effluent through a fine screen having a mesh diameter of approximately 8 micrometers to approximately 12 micrometers;
    removing suspended solids from the effluent by adding activated carbon in granular form, activated carbon in powder form or ion exchange resin to the effluent upstream from the fine screen; and
    disinfecting the effluent by adding an oxidizing reagent to the effluent downstream from the settling tank, but upstream from the fine screen, wherein the oxidizing reagent comprises chlorine, sodium hypochlorite, chlorine dioxide or ozone.

3. The method of claim 2 further including further disinfecting the effluent with UV radiation, chlorination or ozonation downstream from the fine screen.

4. The method of claim 1 further comprising:
    settling the sludge in the wastewater in the settling tank at a rate of at least 20 meters per hour;
    the effluent through a fine screen having a mesh diameter of approximately 8 micrometers to approximately 12 micrometers;
    removing suspended solids from the effluent by adding activated carbon in granular form, activated carbon in powder form or ion exchange resin to the effluent upstream from the fine screen; and disinfecting the effluent with UV with radiation, chlorination or ozonation downstream from the settling tank, but upstream from the fine screen.

5. A method of treating water having helminth egg and other suspended solids, the method comprising:

directing water into a settling tank and settling the suspended solids in the water at a rate of at least 10 meters per hour and producing an effluent; and downstream from the settling tank, filtering the effluent through a fine screen having a mesh diameter of approximately 8 micrometers to approximately 12 micrometers.

6. The method of claim 5 further comprising settling the sludge in the wastewater in the settling tank at a rate of at least 20 meters per hour.

7. The method of claim 5 further comprising treating the effluent by adding activated carbon in granular form, activated carbon in powder form or ion exchange resin to the effluent and adding an oxidizing reagent into the effluent upstream from the fine screen, wherein the oxidizing reagent comprises chlorine, sodium hypochlorite, chlorine dioxide or ozone.

8. The method of claim 7 further including disinfecting the effluent with UV radiation, chlorination or ozonation downstream from the fine screen.

* * * * *